(12) United States Patent
Chen et al.

(10) Patent No.: US 12,353,046 B2
(45) Date of Patent: Jul. 8, 2025

(54) OPTICAL COMPONENT DRIVING MECHANISM

(71) Applicant: TDK TAIWAN CORP., Taoyuan (TW)

(72) Inventors: Shu-Shan Chen, Taoyuan (TW); Pai-Jui Cheng, Taoyuan (TW); Chieh-An Chang, Taoyuan (TW); Hsiao-Hsin Hu, Taoyuan (TW); Chao-Chang Hu, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 653 days.

(21) Appl. No.: 17/705,663

(22) Filed: Mar. 28, 2022

(65) Prior Publication Data

US 2022/0308307 A1    Sep. 29, 2022

Related U.S. Application Data

(60) Provisional application No. 63/167,300, filed on Mar. 29, 2021.

(51) Int. Cl.

| | |
|---|---|
| *G02B 7/08* | (2021.01) |
| *G02B 7/04* | (2021.01) |
| *G02B 27/64* | (2006.01) |
| *G03B 3/10* | (2021.01) |
| *G03B 5/00* | (2021.01) |
| *G03B 11/04* | (2021.01) |
| *H01F 7/02* | (2006.01) |
| *H01F 7/08* | (2006.01) |

(52) U.S. Cl.
CPC ............... *G02B 7/08* (2013.01); *G02B 7/04* (2013.01); *G02B 27/646* (2013.01); *G03B 3/10* (2013.01); *G03B 5/00* (2013.01); *G03B 11/043* (2013.01); *H01F 7/02* (2013.01); *H01F 7/081* (2013.01); *G03B 2205/0007* (2013.01); *G03B 2205/0053* (2013.01)

(58) Field of Classification Search
USPC .......................................................... 396/55
See application file for complete search history.

(56) References Cited

U.S. PATENT DOCUMENTS

| | | | |
|---|---|---|---|
| 7,477,799 B2 * | 1/2009 | Chang ................ | G03B 21/142 |
| | | | 348/E5.142 |
| 8,320,753 B2 * | 11/2012 | Lee ..................... | G03B 17/00 |
| | | | 348/208.11 |

(Continued)

FOREIGN PATENT DOCUMENTS

TW        202206778 A     *   2/2022

*Primary Examiner* — Clayton E. LaBalle
*Assistant Examiner* — Warren K Fenwick
(74) *Attorney, Agent, or Firm* — Muncy, Geissler, Olds & Lowe, P.C.

(57) ABSTRACT

An optical component driving mechanism is provided. The optical component driving mechanism includes a fixed portion, a movable portion, a driving assembly, and a first weighting component. The movable portion and the fixed portion are arranged along an optical axis. The movable portion is movable relative to the fixed portion. The driving assembly is configured to drive the movable portion to move relative to the fixed portion. The first weighting component is fixedly connected to the fixed portion. The driving assembly is disposed on the first weighting component.

18 Claims, 9 Drawing Sheets

(56) References Cited

U.S. PATENT DOCUMENTS

| | | | | |
|---|---|---|---|---|
| 8,564,676 B2* | 10/2013 | Watanabe | ............ | H04N 23/685 |
| | | | | 327/539 |
| 8,611,733 B2* | 12/2013 | Ohishi | ............... | H04N 23/6815 |
| | | | | 396/55 |
| 8,768,156 B2* | 7/2014 | Ohishi | ................... | H04N 23/68 |
| | | | | 396/52 |
| 10,082,676 B2* | 9/2018 | Takano | .............. | H04N 23/6812 |
| 11,846,827 B2* | 12/2023 | Hu | ......................... | G02B 7/102 |
| 2007/0196085 A1* | 8/2007 | Enomoto | ............... | H04N 23/68 |
| | | | | 396/55 |
| 2022/0308357 A1* | 9/2022 | Chen | ....................... | H01F 7/081 |

* cited by examiner

OPTICAL COMPONENT DRIVING MECHANISM

CROSS REFERENCE TO RELATED APPLICATIONS

This application claims the benefit of U.S. Provisional Application No. 63/167,300 filed 29 Mar. 2021, the entirety of which is incorporated by reference herein.

BACKGROUND OF THE INVENTION

Field of the Invention

The present invention relates to an optical component driving mechanism, and more particularly to an optical component driving mechanism having a weighting component.

Description of the Related Art

As technology has developed, it has become more common to include image-capturing and video-recording functions into many types of modern electronic devices, such as smartphones and digital cameras. These electronic devices are used more and more often, and new models have been developed that are convenient, thin, and lightweight, offering more choice to consumers.

Electronic devices that have image-capturing or video-recording functions normally include an optical component driving mechanism to drive an optical component (such as a lens) to move along its optical axis, thereby achieving auto focus (AF) or optical image stabilization (OIS). Light may pass through the optical component and may form an image on an optical sensor. However, the trend in modern mobile devices is to have a smaller size and a higher durability. As a result, how to effectively reduce the size of the optical component driving mechanism and how to increase its durability have become important issues.

BRIEF SUMMARY OF THE INVENTION

An optical component driving mechanism is provided. The optical component driving mechanism includes a fixed portion, a movable portion, a driving assembly, and a first weighting component. The movable portion and the fixed portion are arranged along an optical axis. The movable portion is movable relative to the fixed portion. The driving assembly is configured to drive the movable portion to move relative to the fixed portion. The first weighting component is fixedly connected to the fixed portion. The driving assembly is disposed on the first weighting component.

According to some embodiments of the present disclosure, the material of the first weighting component is different from the material of the fixed portion. The density of the first weighting component is greater than the density of the fixed portion.

According to some embodiments of the present disclosure, the optical component driving mechanism further includes a sensing assembly for sensing the movement of the movable portion relative to the fixed portion. The sensing assembly includes a sensing component and a magnetic component. The sensing component is disposed on the fixed portion. The magnetic component is disposed on the movable portion.

According to some embodiments of the present disclosure, the driving assembly includes a driving component, a transmission component, and a second weighting component. The transmission component is connected to the driving component. The second weighting component is connected to the driving component. The density of the second weighting component is greater than the density of the fixed portion.

According to some embodiments of the present disclosure, the driving component is positioned between the transmission component and the second weighting component. The second weighting component is disposed in the first weighting component.

According to some embodiments of the present disclosure, the optical component driving mechanism further includes an adhesive component. The adhesive component is disposed between the first weighting component and the second weighting component.

According to some embodiments of the present disclosure, the movable portion includes a first recessed portion and a first opening. The first opening is located in the first recessed portion. The transmission component passes through the first opening.

According to some embodiments of the present disclosure, the optical component driving mechanism further includes a first elastic component and a plurality of second elastic components. The first elastic component is positioned in the first opening. The second elastic components are partially positioned within the first opening. The first elastic component surrounds the second elastic components and the transmission component. The second elastic components are located between the first elastic component and the transmission component. The driving assembly is movably connected to the movable portion through the first elastic component and the second elastic components.

According to some embodiments of the present disclosure, the second elastic components include a plurality of flat portions, positioning the second elastic components. The fixed portion further includes a top surface. The top surface is perpendicular to the optical axis. The flat portions are parallel to the top surface. The flat portions are disposed in the first recessed portion.

According to some embodiments of the present disclosure, the fixed portion further includes a ring structure and a base. The ring structure surrounds the transmission component. The ring structure extends toward the base from the top surface in a direction that is parallel to the optical axis.

According to some embodiments of the present disclosure, the base includes a second opening. The transmission component passes through the first opening and the second opening. The first opening and the second opening at least partially overlap when viewed along the optical axis.

According to some embodiments of the present disclosure, the optical component driving mechanism further includes a first buffer component and a second buffer component. The first buffer component is located between the ring structure and the transmission component. The second buffer component is located between the second opening and the transmission component.

According to some embodiments of the present disclosure, the movable portion includes a first stopper component and a second stopper component. The fixed portion includes a housing and a base. The housing includes a top surface. The first stopper component contacts the top surface when the movable portion moves into a first limit position. The second stopper component contacts the base when the movable portion moves into a second limit position.

According to some embodiments of the present disclosure, the optical component driving mechanism further includes a plurality of supporting components fixedly connected to the base. The supporting components each pass through the movable portion to assist the movable portion to move between the first limit position and the second limit position.

According to some embodiments of the present disclosure, the optical component driving mechanism further includes a circuit assembly. The base includes a block wall. The block wall extends toward the top surface from the base in a direction that is parallel to the optical axis. The housing further includes a sidewall. The sidewall extends toward the base from the top surface in another direction that is parallel to the optical axis. The sidewall is perpendicular to the top surface. The circuit assembly is disposed on the block wall. The circuit assembly, the block wall, and the sidewall are parallel to each other. The driving assembly is electrically connected to the circuit assembly.

According to some embodiments of the present disclosure, the fixed portion includes a top surface, a first bottom surface, and a second bottom surface. The first bottom surface and the second bottom surface are parallel to the top surface. The level of the first bottom surface is lower than the level of the second bottom surface when viewed along any direction perpendicular to the optical axis. The distance between the first bottom surface and the top surface is greater than the distance between the second bottom surface and the top surface.

According to some embodiments of the present disclosure, the movable portion includes a first recessed portion. The fixed portion further includes a second recessed portion. The first recessed portion, the second recessed portion, and the first bottom surface overlap when viewed along the optical axis.

According to some embodiments of the present disclosure, the fixed portion includes an extending portion. The extending portion includes a first wall and a second wall. The first wall is perpendicular to the second wall. The shortest distance from the first weighting component to the optical axis is greater than the shortest distance from the extending portion to the optical axis when viewed along the optical axis.

According to some embodiments of the present disclosure, the first weighting component includes a hollow portion and a protruding portion. The fixed portion further includes a sidewall and a base. The sidewall is parallel to the optical axis. At least a portion of the driving assembly is accommodated in the hollow portion. The protruding portion protrudes upward from the first weighting component in a direction that is parallel to the optical axis. The protruding portion is between the base and the sidewall when viewed along the optical axis.

According to some embodiments of the present disclosure, the first weighting component further includes a plurality of lock structures. The first wall and the second wall each include a notch. The notches are at the same level when viewed from any direction perpendicular to the optical axis. The lock structures may be engaged with the respective notches to fixedly connect the first weighting component to the base.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF THE INVENTION

Figure 1:
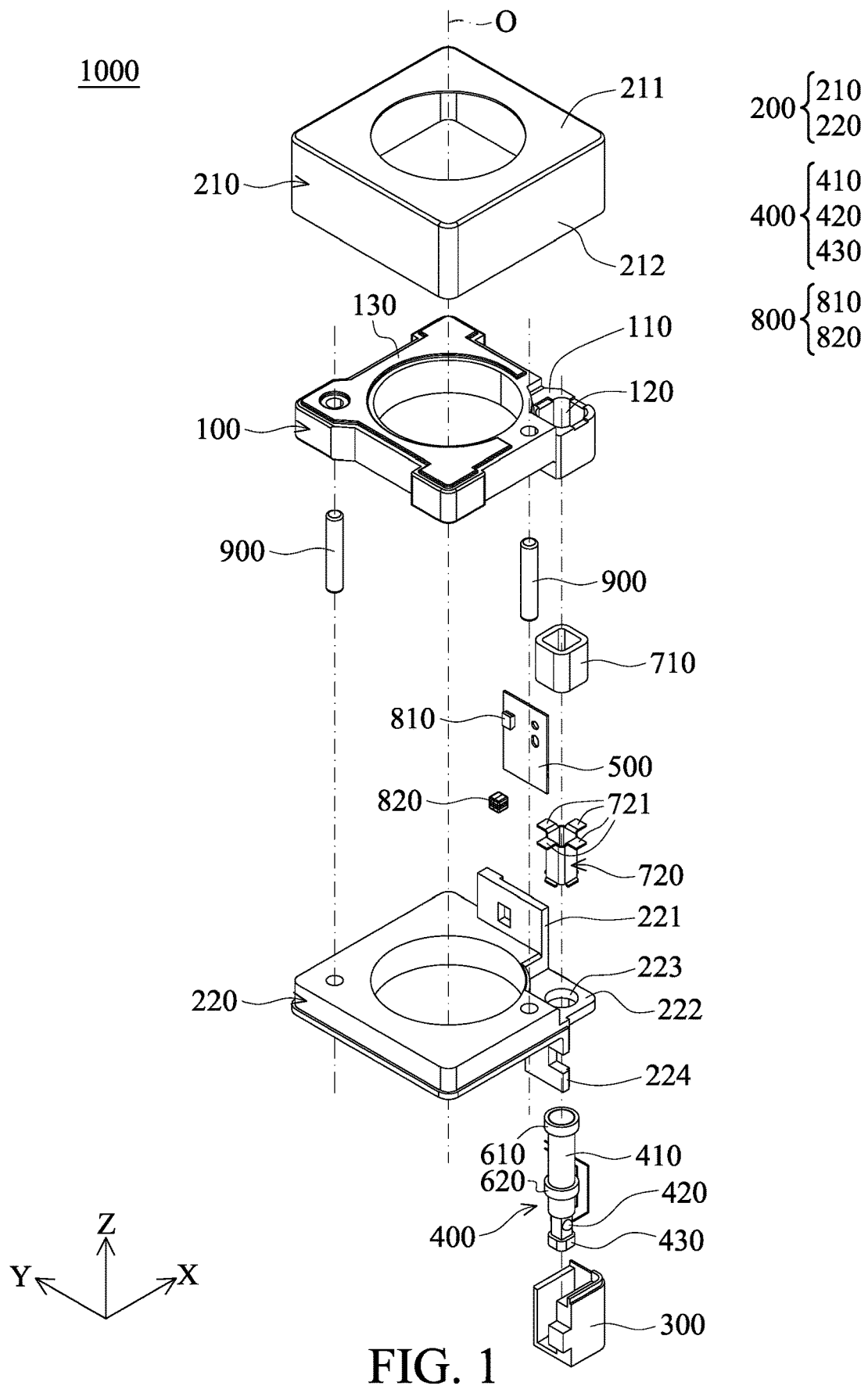
FIG. 1 is an exploded view of an optical component driving mechanism, according to certain aspects of the present disclosure.

The present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used in the present disclosure for ease of description of one feature's relationship to another feature. The spatially relative terms are intended to cover different orientations of the device, including the features.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

In addition, in some embodiments of the present disclosure, terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise.

FIG. 1 is an exploded view of an optical component driving mechanism 1000, according to certain aspects of the present disclosure. As shown in FIG. 1, the optical component driving mechanism 1000 includes a movable portion 100, a fixed portion 200, a first weighting component 300, a driving assembly 400, a circuit assembly 500, a first buffer component 610, a second buffer components 620, a first elastic component 710, a set of second elastic components 720, a sensing assembly 800, two supporting components 900, and a plurality of adhesive components 1010 (FIG. 4B).

The movable portion 100 may be a holder connecting an optical component (not shown), the optical component has an optical axis O, and the optical axis O is generally parallel to the Z direction. The movable portion 100 and the fixed portion 200 are arranged along the optical axis O. The movable portion 100 is movable relative to the fixed portion 200 to perform the auto-focusing function. The movable portion 100 includes a first recessed portion 110, a first opening 120, a first stopper component 130, and a second stopper component 140 (see FIGS. 3A to 3B).

The movable portion 100 has four corners, and the first recessed portion 110 is located at the corner that is closest to the driving assembly 400. As shown in FIG. 1, the first recessed portion 110 has a structure recessed in the negative Z direction relative to the first stopper component 130, and the first opening 120 is located in the first recessed portion 110.

The fixed portion 200 includes a housing 210 and a base 220. The housing 210 includes a top surface 211, four sidewalls 212, and a ring structure 213 (see FIGS. 3A to 3B). The sidewalls 212 extend from the top surface 211 in a direction that is parallel to the optical axis O, and the sidewalls 212 are perpendicular to the top surface 211.

Figure 3A:
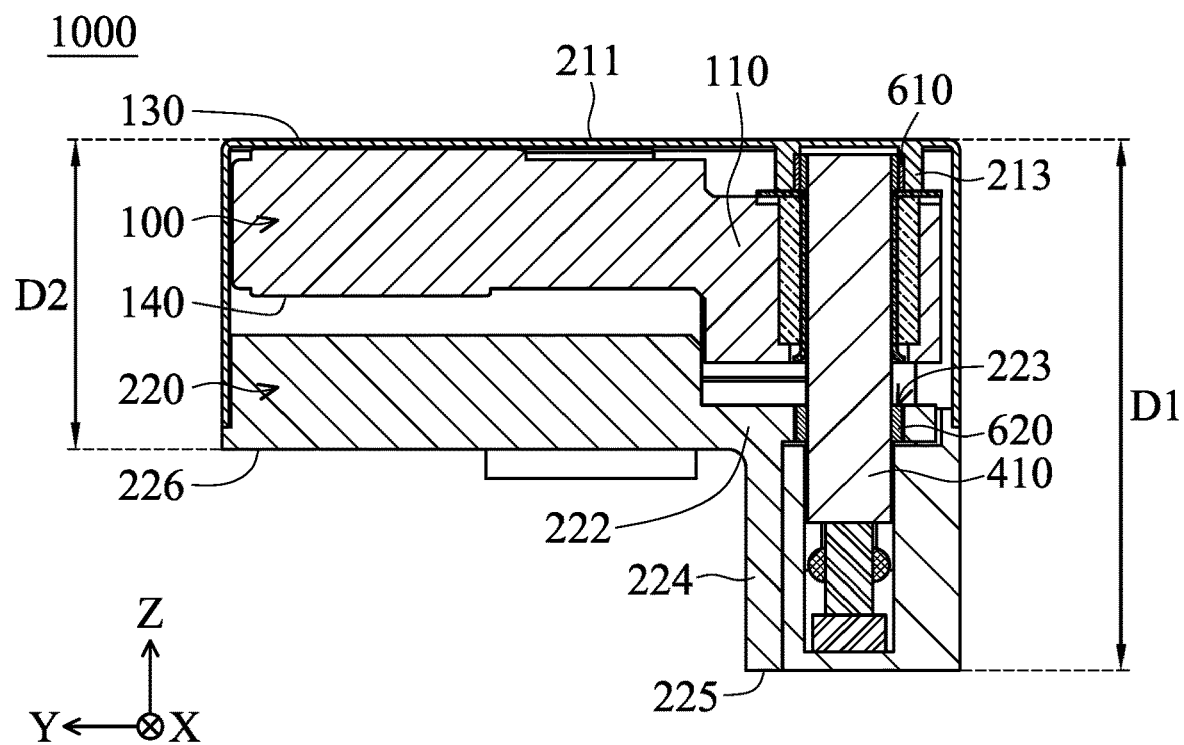
FIG. 3A is a cross-sectional view of the optical component driving mechanism when the movable portion is in the first limit position, wherein the cross-sectional view is taken along the line A-A' in FIG. 2B.
Figure 3B:
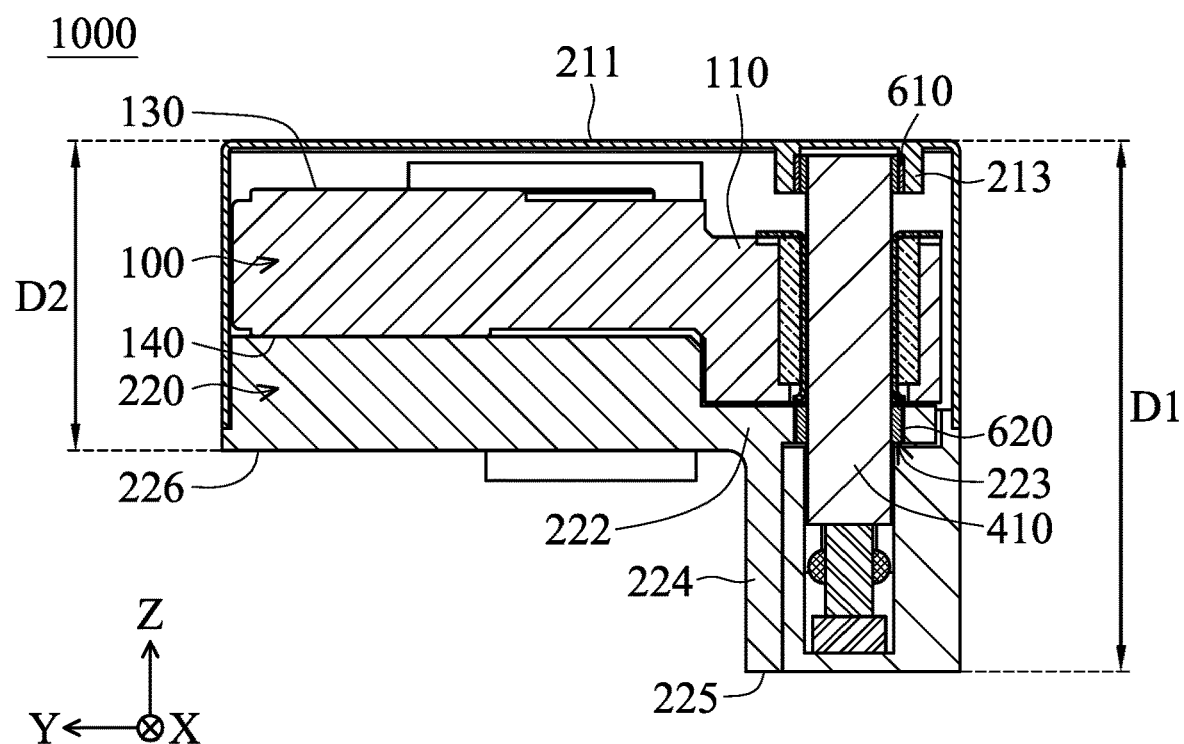
FIG. 3B is a cross-sectional view of the optical component driving mechanism when the movable portion is in the second limit position, wherein the cross-sectional view is taken along the line A-A' in FIG. 2B.

The base 220 includes a block wall 221, a second recessed portion 222, a second opening 223, an extending portion 224, a first bottom surface 225 (see FIGS. 3A to 3B), and a second bottom surface 226 (see FIGS. 3A to 3B).

The block wall 221 extends toward the top surface 211 from the base 220 in a direction that is parallel to the optical axis O. The base 220 has four corners, and the second recessed portion 222 is located at the corner that is closest to the driving assembly 400. The second recessed portion 222 has a structure recessed in the negative Z direction. The second opening 223 is located in the second recessed portion 222. The second opening 223 is generally coaxial with the first opening 120. The first opening 120 and the second opening 223 at least partially overlap when viewed along the optical axis O (the Z direction). The extending portion 224 extends downward from the second recessed portion 222 in a direction that is parallel to the optical axis O.

The first weighting component 300 is fixedly connected to the base 220. A portion of the driving assembly 400 is disposed within the first weighting component 300. The connection between the first weighting component 300 and the base 220 and the configuration of the first weighting component 300 relative to the driving assembly 400 are described in detail later. It should be noted that, the first weighting component 300 and the base 220 of the present invention are made of different materials, wherein the density of the first weighting component 300 is greater than the density of the base 220.

The driving assembly 400 is configured to drive the movable portion 100 to move relative to the fixed portion 200. The driving assembly 400 includes a transmission component 410, a driving component 420, and a second weighting component 430. The transmission component 410 passes through the first opening 120 and the second opening 223. The driving component 420 is disposed between the transmission component 410 and the second weighting component 430. The second weighting component 430 is disposed on the first weighting component 300.

In some embodiments, the material of the driving component 420 may include a piezoelectric material. When an electric field (voltage) is applied to the surface of the piezoelectric material, the electric dipole moment will be elongated due to the action of the electric field. In order to resist the change, the piezoelectric material will elongate in the direction of the electric field, so mechanical deformation will occur. As a result, the transmission component 410 may be driven to move. For example, the electric dipole moment of the driving component 420 may be designed to extend in the Z direction, so the transmission component 410 may be driven to move in the Z direction.

The density of the second weighting component 430 may be greater than the density of the transmission component 410 to resist the reaction force when the driving component 420 are driven. In some embodiments, the material of the transmission component 410 may include carbon fiber, while the material of the second weighting component 430 may include metal.

The circuit assembly 500 has a plate-like structure. The circuit assembly 500 is disposed on the block wall 221. The circuit assembly 500 and the block wall 221 are parallel to one of the sidewalls 212 (for example, the sidewall that is parallel to the Y-Z plane), and the driving assembly 400 is electrically connected to circuit assembly 500.

The first buffer component 610 and the second buffer component 620 may be respectively disposed on the transmission component 410 and surround the transmission component 410. The first buffer component 610 and the second buffer component 620 may be made of elastic material (for example, silicone). The first buffer component 610 and the second buffer component 620 may be movably connected to the transmission component 410 by frictional contact, so as to define the position of the transmission component 410.

The first elastic component 710 has a hollow structure. A set of the second elastic components 720 includes four flat portions 721 in total for being disposed on the first recessed portion 110, to position the second elastic components 720. The flat portions 721 are parallel to top surface 211.

In some embodiments, the first elastic component 710 and the second elastic components 720 may include different materials. For example, in some embodiments, the first elastic component 710 may include a soft material, and the second elastic component 720 may include a metallic material.

The sensing assembly 800 includes a sensing component 810 and a magnetic component 820. The sensing component 810 and the magnetic component 820 may be disposed on the fixed portion 200 (for example, the base 220) and the movable portion 100 respectively, or their positions may be interchanged, depending on design requirements. Thereby, the position of the movable portion 100 relative to the fixed portion 200 may be sensed. In this embodiment, the sensing component 810 is disposed on the fixed portion 200 and is electrically connected to the circuit assembly 500. The magnetic component 820 is disposed in the movable portion 100.

In some embodiments, the sensing component 810 may include sensing components such as, a Hall sensor, a magnetoresistance effect sensor (MR Sensor), a giant magnetoresistance effect sensor (GMR Sensor), tunneling magnetoresistance effect sensor (TMR Sensor), or fluxgate sensor, depending on design requirements.

The supporting components 900 are fixedly connected to the base 220. The supporting components 900 each pass through the movable portion 100 to assist the movable portion 100 to move between a first limit position and a second limit position. The movement of the movable portion 100 between the first limit position and the second limit position is described in detail with reference to FIGS. 3A to 3B.

Figure 2A:
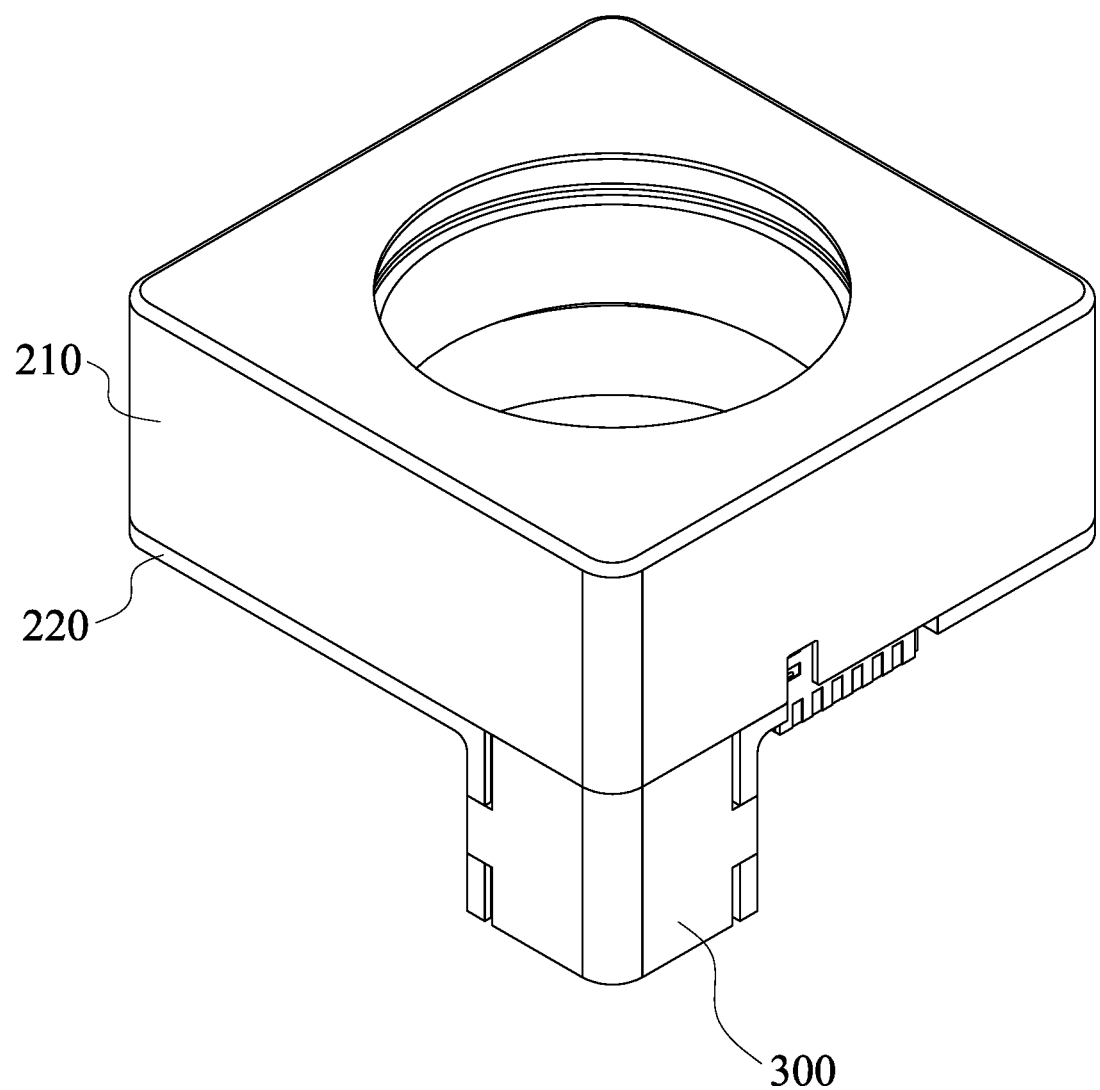
FIG. 2A is a perspective view of the optical component driving mechanism, according to certain aspects of the present disclosure.
Figure 2B:
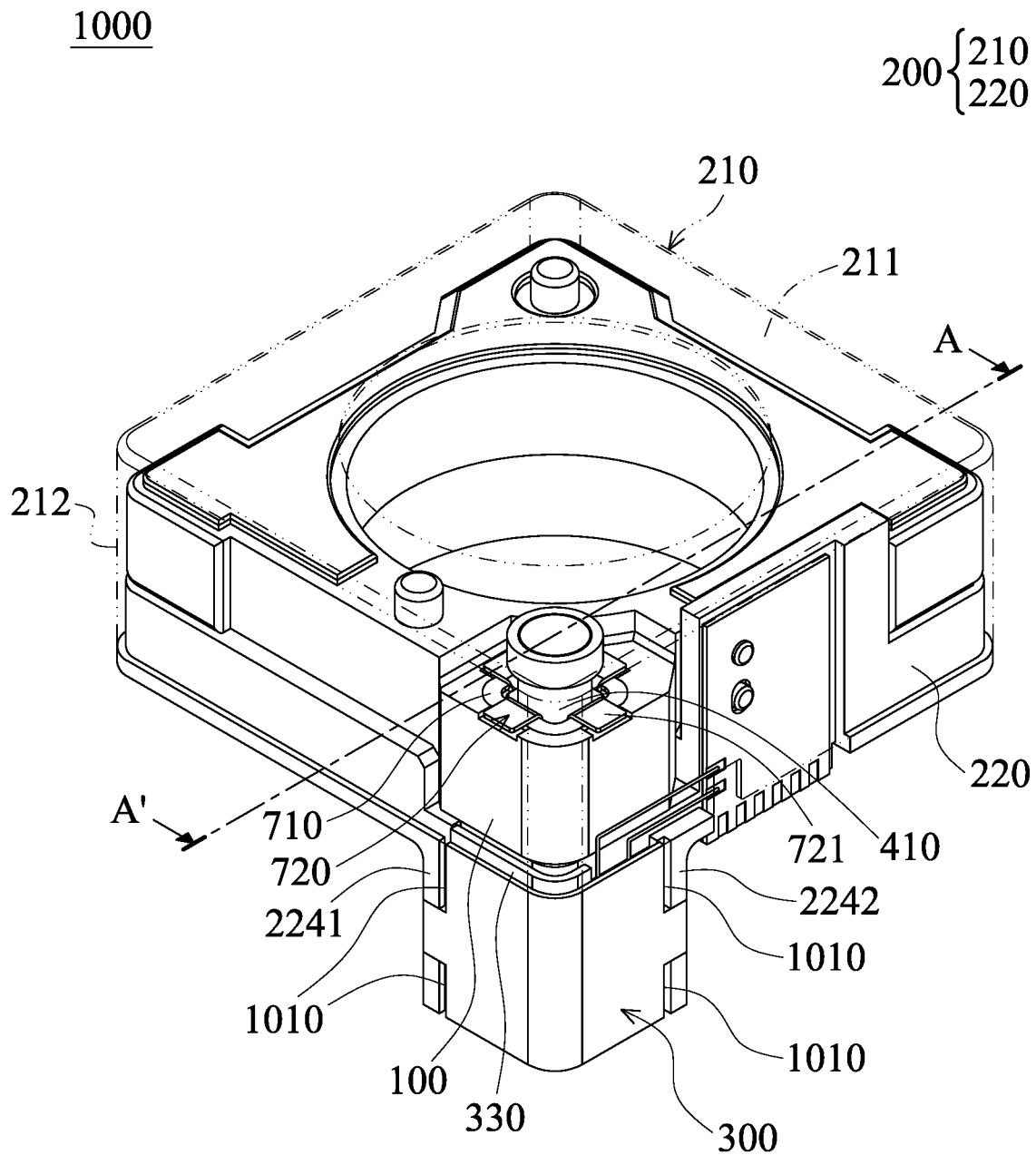
FIG. 2B is the optical component driving mechanism of FIG. 2A with the housing shown in dash lines.

FIG. 2A is a perspective view of the optical component driving mechanism 1000, according to certain aspects of the present disclosure. FIG. 2B is the optical component driving mechanism 1000 of FIG. 2A with the housing 210 shown in dash lines. As shown in FIG. 2A, the housing 210 is fixed to the base 220, and the first weighting component 300 is engaged with the base 220. The engagement between the first weighting component 300 and the base 220 is described in detail with reference to FIG. 5.

As shown in FIG. 2B, the first elastic component 710 is positioned in the first opening 120, and the second elastic component 720 is partially positioned in the first opening 120. The first elastic component 710 surrounds the second elastic component 720.

The first elastic component 710 is an elastic body that may hold the transmission component 410 stably. The flat portions 721 of the second elastic components 720 are positioned on the movable portion 100. The second elastic component 720 stably contacts the transmission component 410 by characteristics of the elastic properties of the first elastic component 710.

FIG. 3A is a cross-sectional view of the optical component driving mechanism 1000 taken along the line A-A' in FIG. 2B when the movable portion 100 is located in the first limit position. FIG. 3B is a cross-sectional view of the optical component driving mechanism 1000 taken along the line A-A' in FIG. 2B when the movable portion 100 is located in the second limit position.

As shown in FIG. 3A, when the movable portion 100 moves into the first limit position, the first stopper component 130 contacts the top surface 211 of the housing 210. As shown in FIG. 3B, when the movable portion 100 moves into the second limit position, the second stopper component 140 contacts the base 220.

Please refer to FIGS. 3A to 3B together, the ring structure 213 protrudes toward the movable portion 100 from the top surface 211. The ring structure 213 surrounds one end of the transmission component 410 to assist in positioning the transmission component 410. The first bottom surface 225 and the second bottom surface 226 of the base 220 can be seen in FIGS. 3A to 3B. The first bottom surface 225 is the bottom surface of the extending portion 224.

The first bottom surface 225 and the second bottom surface 226 are parallel to the top surface 211. When viewed along the X direction, the level of the first bottom surface 225 is lower than the level of the second bottom surface 226. The distance D1 between the first bottom surface 225 and the top surface 211 is greater than the distance D2 between the second bottom surface 226 and the top surface 211. When viewed along the optical axis O (the Z direction), the first recessed portion 110, the second recessed portion 222, and the first bottom surface 225 at least partially overlap.

The first buffer component 610 and the second buffer component 620 disposed on the transmission component 410 can also be seen in FIGS. 3A to 3B. The first buffer component 610 is located between the ring structure 213 and the transmission component 410. The second buffer component 620 is located between the second opening 223 and the transmission component 410. When the optical component driving mechanism 1000 is impacted by an external force, the configuration of the first buffer component 610 and the second buffer component 620 may buffer the external force on the transmission component 410. Thereby, damage to the transmission component 410 may be avoided.

Figure 4A:
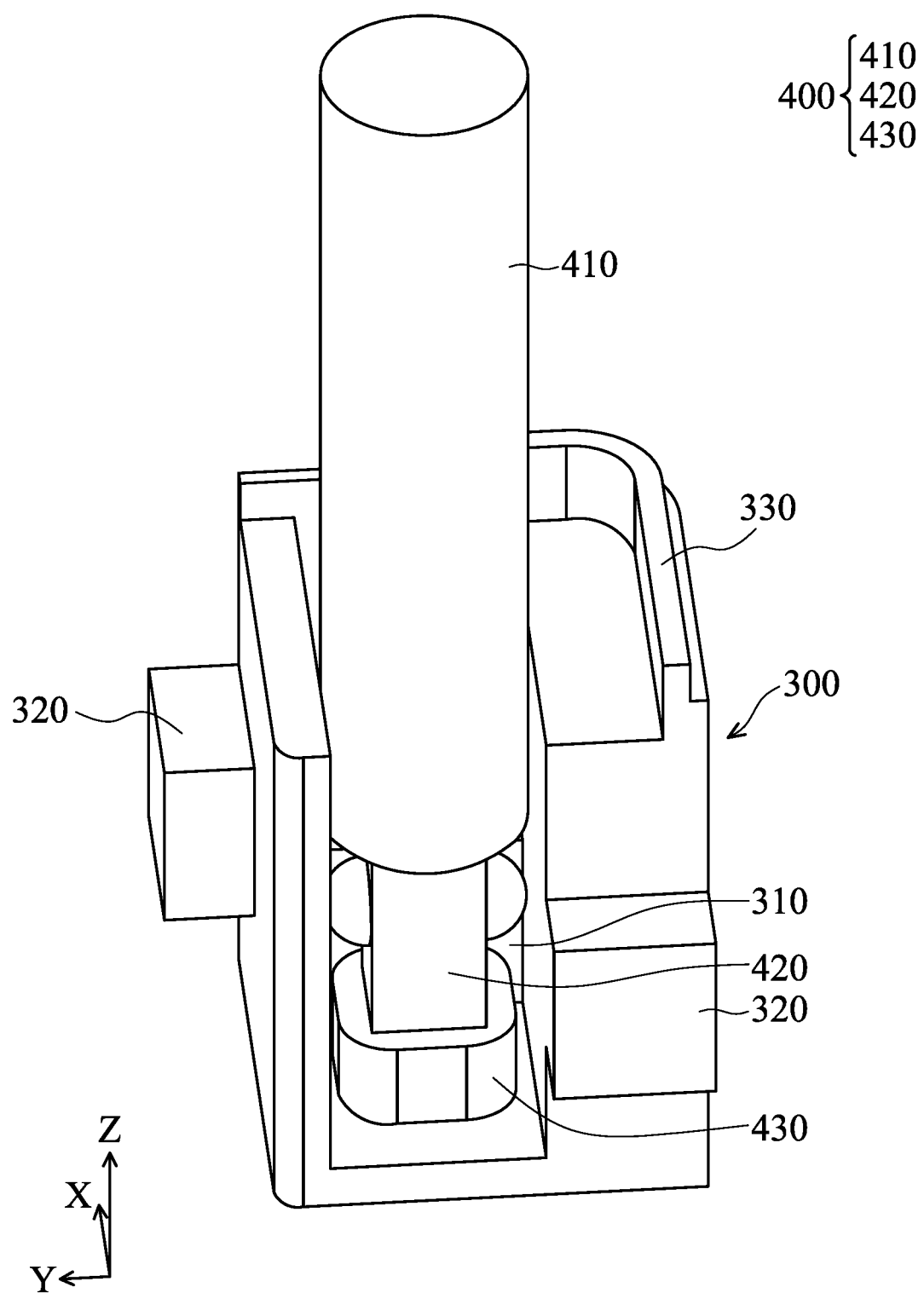
FIG. 4A is a perspective view of a first weighting component and a driving assembly, according to certain aspects of the present disclosure.
Figure 4B:
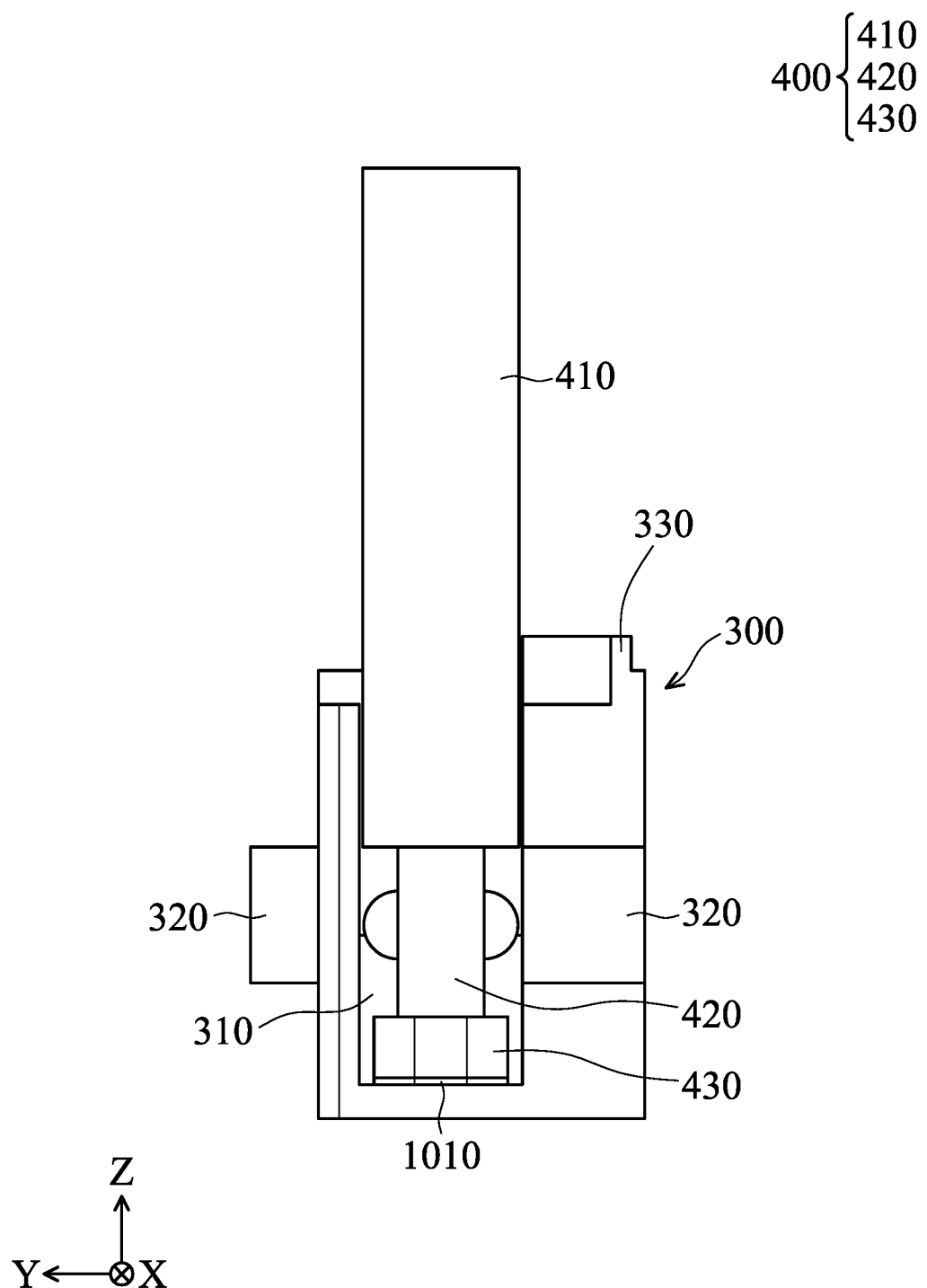
FIG. 4B is a side view of the first weighting component and the driving assembly, according to certain aspects of the present disclosure.

FIG. 4A is a perspective view of the first weighting component 300 and the driving assembly 400, according to certain aspects of the present disclosure. FIG. 4B is a side view of the first weighting component 300 and the driving assembly 400, according to certain aspects of the present disclosure. Please refer to FIGS. 4A to 4B together, the first weighting component 300 includes a hollow portion 310, two lock structures 320, and a protruding portion 330.

At least a portion of the driving assembly 400 is accommodated within the hollow portion 310. The lock structures 320 protrude horizontally from the first weighting component 300 along the negative X direction and the positive Y direction, respectively. The adhesive component 1010 is disposed between the first weighting component 300 and the second weighting component 430 to fixedly connect the second weighting component 430 to the first weighting component 300.

It should be understood that, the adhesive component 1010 is depicted here for illustrative purposes only, and does not represent its actual size. It should be understood that, the lock structure 320 has a rectangular shape in the present embodiment, but in different embodiments, the lock structure may have a shape that is different from the present embodiment.

Since the material of the first weighting component 300 is a material with a relatively high density (for example, between about 5 g/cm$^3$ to 20 g/cm$^3$). Thus, when the driving assembly 400 is driven, the transmitted vibration wave may be less energy loss compared with no first weighting component. Thereby, the optical component driving mechanism 1000 has better performance (for example, it can drive a movable portion with a larger mass, or can increase the moving speed of the movable portion).

It should be understood that, the first weighting component 300 and the second weighting component 430 of the present disclosure may have the same density or different densities. Although in this embodiment, the first weighting component 300 and the second weighting component 430 are two separate components, it should be understood that in different embodiments, the first weighting component 300 and the second weighting component 430 may have an integrally formed structure.

Referring back to FIG. 2B, the protruding portion 330 extends from the first weighting component 300 in a direction toward the top surface 211. When viewed along the Z direction, the protruding portion 330 is located between the base 220 and a portion of the sidewall 211 of the housing 210, that is, the protruding portion 330 is accommodated in the housing 210.

The configuration of the protruding portion 330 makes the fixation between the first weighting component 300 and the fixed portion 200 more secure. Since the housing 210 covers the protruding portion 330, the protruding portion 330 will prevent the first weighting component 300 from detaching from the optical component driving mechanism 1000 when the optical component driving mechanism 1000 is impacted by an external force.

Figure 5:
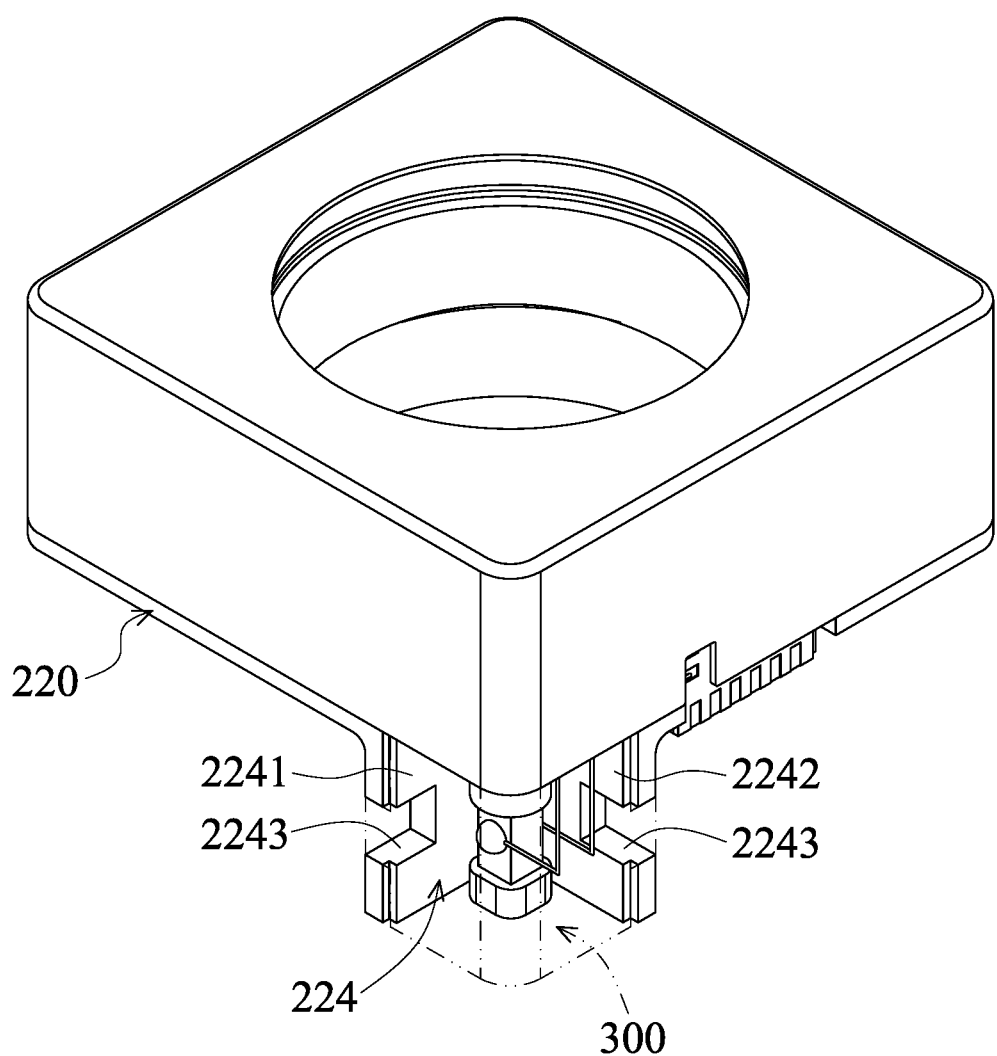
FIG. 5 is a perspective view of the optical component driving mechanism, according to certain aspects of the present disclosure, wherein the first weighting component is shown in dash lines for illustrative purposes.

FIG. 5 is a perspective view of the optical component driving mechanism 1000, according to certain aspects of the present disclosure. For the purpose of illustration, the first weighting component 300 is shown in dash lines. The extending portion 224 includes a first wall 2241 and a second wall 2242. The first wall 2241 is perpendicular to the second wall 2242.

The first wall 2241 and the second wall 2242 each include a notch 2243. When viewed along the X direction or the Y direction, the two notches 2243 are in the same level, and the lock structures 320 (FIG. 4A) may be engaged with the respective notches 2243 to fixedly connect the first weighting component 300 to the base 220.

With the engagement between the lock structures 320 (FIG. 4A) and the notches 2243, when the optical component driving mechanism 1000 is impacted by an external force, the first weighting component 300 will not easily detach from the base 220. Referring back to FIG. 2B, the adhesive components 1010 are respectively disposed in the gap between the first weighting component 300 and the first wall 2241 and the gap between the first weighting component 300 the second wall 2242. It should be understood that, the present invention may use other means of connecting the first weighting component 300 to the base 220, for example, using fasteners and the like.

Figure 6:
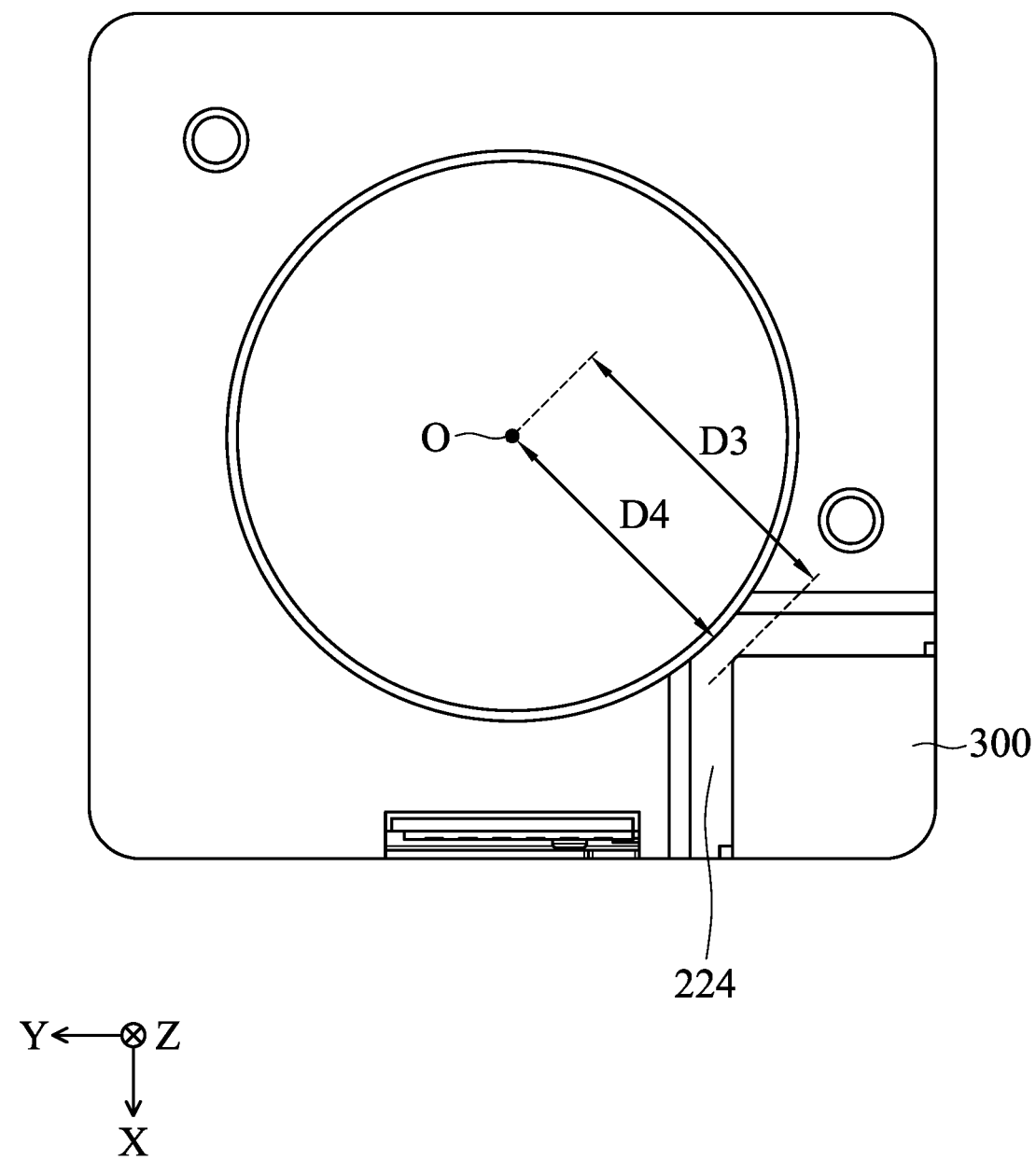
FIG. 6 is a bottom view of the optical component driving mechanism, according to certain aspects of the present disclosure.

FIG. 6 is a bottom view of the optical component driving mechanism 1000, according to certain aspects of the present disclosure. As shown in FIG. 6, the shortest distance D3 from the first weighting component 300 to the optical axis O is greater than the shortest distance D4 from the extending portion 224 to the optical axis O.

Figure 7A:
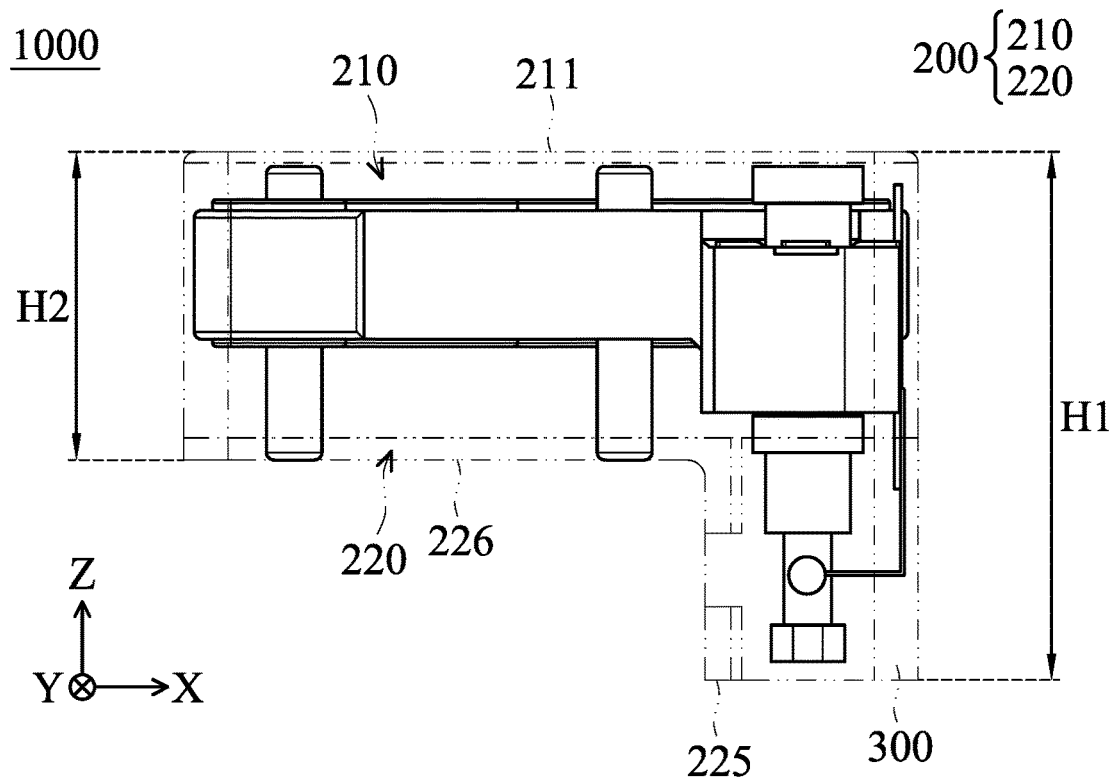
FIG. 7A is a side view of the optical component driving mechanism, wherein the fixed portion and the first weighting component are shown in dash line.
Figure 7B:
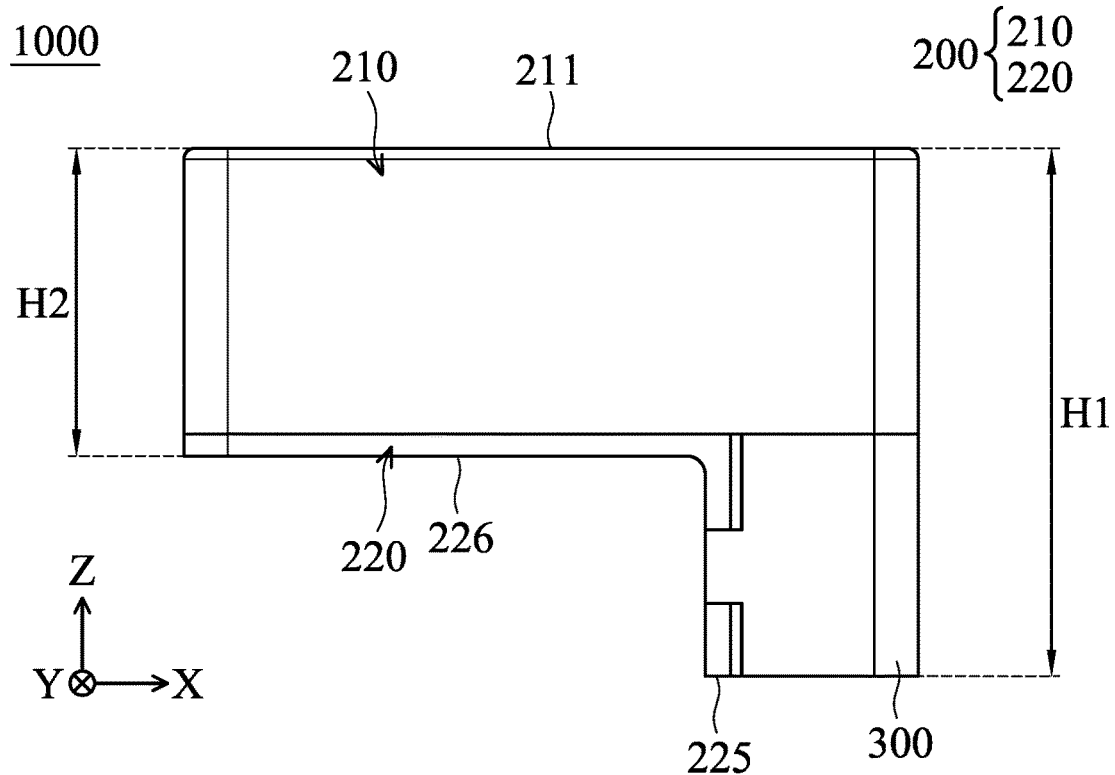
FIG. 7B is a side view of the optical component driving mechanism, according to certain aspects of the present disclosure.

FIG. 7A is a side view of the optical component driving mechanism 1000, wherein the fixed portion 200 and the first weighting component 300 are shown in dash lines. FIG. 7B is a side view of the optical component driving mechanism 1000, according to certain aspects of the present disclosure.

As shown in FIGS. 7A to 7B, the height of the optical component driving mechanism 1000 in the Z direction may be divided into two parts, which are the height H1 from the top surface 211 to the first bottom surface 225, and the height H2 from the top surface 211 to the second bottom surface 226.

Compared with other optical component driving mechanisms having the height H1, the optical component driving mechanism 1000 of the present invention may not only have the same driving capability, but also achieve miniaturization due to the reduction in size of the height H2.

Since the configuration of the driving assembly 400 of the present invention is not limited by the height H2, and accommodates the driving assembly 400 in the size of the height H1, the optical component driving mechanism 1000 may have a larger driving force to improve the performance of the optical component driving mechanism 1000, compared with other optical component driving mechanisms having the height H2.

The relative positions and size relationship of the elements in the present disclosure may allow the driving mechanism achieving miniaturization in specific directions or for the entire mechanism. Moreover, the configuration of the weighting component may resist the reaction force when the driving component is operating. Thereby the driving assembly is stabilized and energy consumption is reduced, so that the optical component driving mechanism may have better characteristics. For example, the moving speed of the movable portion relative to the fixed portion may be increased, etc.

Although embodiments of the present disclosure and their advantages already have been described in detail, it should be understood that various changes, substitutions and alterations may be made herein without departing from the spirit and the scope of the disclosure as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are also intended to include within their scope of such processes, machines, manufacture, and compositions of matter, means, methods, or steps. In addition, each claim herein constitutes a separate embodiment, and the combination of various claims and embodiments are also within the scope of the disclosure.

What is claimed is:

1. An optical component driving mechanism, comprising:
    a fixed portion;
    a movable portion arranged with the fixed portion along an optical axis, wherein the movable portion is movable relative to the fixed portion;
    a driving assembly for driving the movable portion to move relative to the fixed portion; and
    a first weighting component fixedly connected to the fixed portion, wherein the driving assembly is disposed on the first weighting component;
    wherein the driving assembly comprises:
        a driving component;
        a transmission component connected to the driving component; and
        a second weighting component connected to the driving component, wherein a density of the second weighting component is greater than a density of the fixed portion;
    wherein the driving component is positioned between the transmission component and the second weighting component, and the second weighting component is disposed in the first weighting component.

2. The optical component driving mechanism as claimed in claim 1, wherein a material of the first weighting component is different from a material of the fixed portion, and a density of the first weighting component is greater than a density of the fixed portion.

3. The optical component driving mechanism as claimed in claim 1, further comprising a sensing assembly for sensing a movement of the movable portion relative to the fixed portion, wherein the sensing assembly comprises a sensing component and a magnetic component, the sensing component is disposed on the fixed portion, and the magnetic component is disposed on the movable portion.

4. The optical component driving mechanism as claimed in claim 1, further comprising an adhesive component, wherein the adhesive component is disposed between the first weighting component and the second weighting component.

5. The optical component driving mechanism as claimed in claim 1, wherein the movable portion comprises a first recessed portion and a first opening, wherein the first opening is located in the first recessed portion, and the transmission component passes through the first opening.

6. The optical component driving mechanism as claimed in claim 5, further comprising a first elastic component and a plurality of second elastic components, wherein the first elastic component is positioned in the first opening, and the second elastic components are partially positioned within the first opening, the first elastic component surrounds the second elastic components and the transmission component, the second elastic components are located between the first elastic component and the transmission component, and the driving assembly is movably connected to the movable portion through the first elastic component and the second elastic components.

7. The optical component driving mechanism as claimed in claim 6, wherein the second elastic components comprise a plurality of flat portions for positioning the second elastic components, and the fixed portion further comprises a top surface, wherein the top surface is perpendicular to the optical axis, the flat portions are parallel to the top surface, and the flat portions are disposed in the first recessed portion.

8. The optical component driving mechanism as claimed in claim 7, wherein the fixed portion further comprises a ring structure and a base, wherein the ring structure surrounds the transmission component, and the ring structure extends toward the base from the top surface in a direction that is parallel to the optical axis.

9. The optical component driving mechanism as claimed in claim 8, wherein the base comprises a second opening, wherein the transmission component passes through the first opening and the second opening, and the first opening and the second opening at least partially overlap when viewed along the optical axis.

10. The optical component driving mechanism as claimed in claim 9, further comprising a first buffer component and a second buffer component, wherein the first buffer component is located between the ring structure and the transmission component, and the second buffer component is located between the second opening and the transmission component.

11. The optical component driving mechanism as claimed in claim 1, wherein the fixed portion comprises a first bottom surface, a second bottom surface, and a housing having a top surface, wherein the first bottom surface and the second bottom surface are parallel to the top surface of the housing, a level of the first bottom surface is lower than a level of the second bottom surface when viewed along any direction that is perpendicular to the optical axis, and a distance between the first bottom surface and the top surface of the housing is greater than a distance between the second bottom surface and the top surface of the housing.

12. The optical component driving mechanism as claimed in claim 11, wherein the movable portion comprises a first recessed portion, the fixed portion further comprises a second recessed portion, and the first recessed portion, the second recessed portion, and the first bottom surface overlap when viewed along the optical axis.

13. An optical component driving mechanism, comprising:
a fixed portion;
a movable portion arranged with the fixed portion along an optical axis, wherein the movable portion is movable relative to the fixed portion;
a driving assembly for driving the movable portion to move relative to the fixed portion; and
a first weighting component fixedly connected to the fixed portion, wherein the driving assembly is disposed on the first weighting component;
wherein the movable portion comprises a first stopper component and a second stopper component, the fixed portion comprises a housing and a base, the housing comprises a top surface, wherein the first stopper component contacts the top surface when the movable portion moves into a first limit position, and the second stopper component contacts the base when the movable portion moves into a second limit position.

14. The optical component driving mechanism as claimed in claim 13, further comprising a plurality of supporting components fixedly connected to the base, wherein the supporting components each pass through the movable portion to assist the movable portion to move between the first limit position and the second limit position.

15. The optical component driving mechanism as claimed in claim 14, further comprising a circuit assembly, wherein the base comprises a block wall, the block wall extends toward the top surface of the housing from the base in a direction that is parallel to the optical axis, the housing further comprises a sidewall, wherein the sidewall extends toward the base from the top surface of the housing in another direction that is parallel to the optical axis, the sidewall is perpendicular to the top surface of the housing, the circuit assembly is disposed on the block wall, the circuit assembly, the block wall, and the sidewall are parallel to each other, and the driving assembly is electrically connected to the circuit assembly.

16. An optical component driving mechanism, comprising:
a fixed portion;
a movable portion arranged with the fixed portion along an optical axis, wherein the movable portion is movable relative to the fixed portion;
a driving assembly for driving the movable portion to move relative to the fixed portion; and
a first weighting component fixedly connected to the fixed portion, wherein the driving assembly is disposed on the first weighting component;
wherein the fixed portion comprises an extending portion, the extending portion comprises a first wall and a second wall, the first wall is perpendicular to the second wall, and the shortest distance from the first weighting component to the optical axis is greater than the shortest distance from the extending portion to the optical axis when viewed along the optical axis.

17. The optical component driving mechanism as claimed in claim 16, wherein the first weighting component comprises a hollow portion and a protruding portion, the fixed portion further comprises a sidewall and a base, wherein the sidewall is parallel to the optical axis, at least a portion of the driving assembly is accommodated in the hollow portion, the protruding portion protrudes upward from the first weighting component in a direction that is parallel to the optical axis, and the protruding portion is between the base and the sidewall when viewed along the optical axis.

18. The optical component driving mechanism as claimed in claim 17, wherein the first weighting component further comprises a plurality of lock structures, the first wall and the second wall each comprise a notch, the notches are at a same level when viewed from any direction perpendicular to the optical axis, and the lock structures may be engaged with the respective notches to fixedly connect the first weighting component to the base.

* * * * *